United States Patent
Lee et al.

(10) Patent No.: US 11,262,524 B2
(45) Date of Patent: Mar. 1, 2022

(54) LENS STRUCTURE

(71) Applicant: Rays Optics Inc., Hsinchu County (TW)

(72) Inventors: Chen-Cheng Lee, Hsinchu County (TW); Yu-Hua Huang, Hsinchu County (TW); Chih-Wei Chang, Hsinchu County (TW); Tzu-Lun Wang, Hsinchu County (TW)

(73) Assignee: Rays Optics Inc., Hsinchu County (TW)

( * ) Notice: Subject to any disclaimer, the term of this patent is extended or adjusted under 35 U.S.C. 154(b) by 177 days.

(21) Appl. No.: 16/872,387

(22) Filed: May 12, 2020

(65) Prior Publication Data

US 2020/0271887 A1    Aug. 27, 2020

Related U.S. Application Data

(63) Continuation of application No. 15/811,689, filed on Nov. 14, 2017, now abandoned.

(51) Int. Cl.
*G02B 7/02* (2021.01)

(52) U.S. Cl.
CPC .................... *G02B 7/025* (2013.01)

(58) Field of Classification Search
CPC ............... G02B 7/025; G02B 7/022
See application file for complete search history.

(56) References Cited

U.S. PATENT DOCUMENTS 4,778,253 A * 10/1988 Siga ................. G02B 7/025
156/89.15

* cited by examiner

*Primary Examiner* — James C. Jones
(74) *Attorney, Agent, or Firm* — JCIPRNET

(57) ABSTRACT

A lens structure includes a lens cone, at least one lens and an acrylate adhesive. The lens cone includes at least one contacting structure. The lens is disposed within the lens cone and abuts against the contacting structure. The acrylate adhesive covers an interface between the lens cone and the lens, wherein a coverage area of the acrylate adhesive accounts for more than 70% of a surface area of a side surface of the lens.

20 Claims, 6 Drawing Sheets

LENS STRUCTURE

CROSS-REFERENCE TO RELATED APPLICATION

This application is a continuation application of and claims the priority benefit of U.S. application Ser. No. 15/811,689, filed on Nov. 14, 2017. The entirety of the above-mentioned patent application is hereby incorporated by reference herein and made a part of this specification.

BACKGROUND OF THE INVENTION

Field of the Invention

The invention relates to an optical device, and particularly relates to a lens structure.

Description of Related Art

In the conventional lens structure, an adhesive is located on a light incidence surface or a light emitting surface of the lens and between a partial peripheral surface of the lens and a partial side wall of the lens cone. Since the gluing surface between the lens cone and the lens is not large, the adherence between the lens cone and the lens is poor, and thus the structural stability of the lens structure is affected. In addition, the light transmission efficiency of the lens is affected because a portion of the adhesive is located on the light incidence surface or the light emitting surface of the lens.

SUMMARY OF THE INVENTION

The embodiments of the invention provide a lens structure with a better optical characteristic.

The lens structure of the embodiments of the invention comprises a lens cone, at least one lens, and an acrylate adhesive. The lens cone comprises at least one contacting structure. The lens is disposed within the lens cone and abuts against the contacting structure. The acrylate adhesive covers an interface between the lens cone and the lens, wherein a coverage area of the acrylate adhesive accounts for more than 70% of a surface area of a side surface of the lens.

The lens structure of the embodiments of the invention comprises a lens cone, at least one lens, and an adhesive. The lens cone comprises at least one contacting structure. The lens is disposed within the lens cone and abuts against the contacting structure. The lens has a contacting surface and a side surface connected to the contacting surface. The adhesive is located between the contacting structure of the lens cone and the contacting surface of the lens and between the contacting structure of the lens cone and the side surface of the lens.

The manufacturing process of the lens structure of the embodiments of the invention comprises the following steps: providing a lens cone comprising a contacting structure; disposing an adhesive at a peripheral side wall of the contacting structure; disposing a lens within the lens cone and abutting the lens against the contacting structure, wherein the adhesive is located between a side surface of the lens and the peripheral side wall of the contacting structure, and the coverage area of the adhesive accounts for more than 70% of the surface area of the side surface.

Based on the above, the adhesive of the lens structure of the embodiments of the invention is located between the contacting structure of the lens cone and the contacting surface of the lens and between the contacting structure of the lens cone and the side surface of the lens. Compared to the conventional lens structure in which the adhesive is located on the light incidence surface or the light emitting surface of the lens and between a partial side surface of the lens and a partial side wall of the lens cone, the coverage area of the adhesive of the lens structure of the embodiments of the invention accounts for more than 70% of a surface area of a side surface of the lens. Therefore, a gluing surface between the lens cone and the lens may be increased to improve the adherence. In addition, the adhesive is not located on the light incidence surface or the light emitting surface of the lens, and thus the light transmission efficiency of the lens is not affected. In brief, the lens structure of the embodiments of the invention can have a better optical characteristic and a structural reliability.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1A:
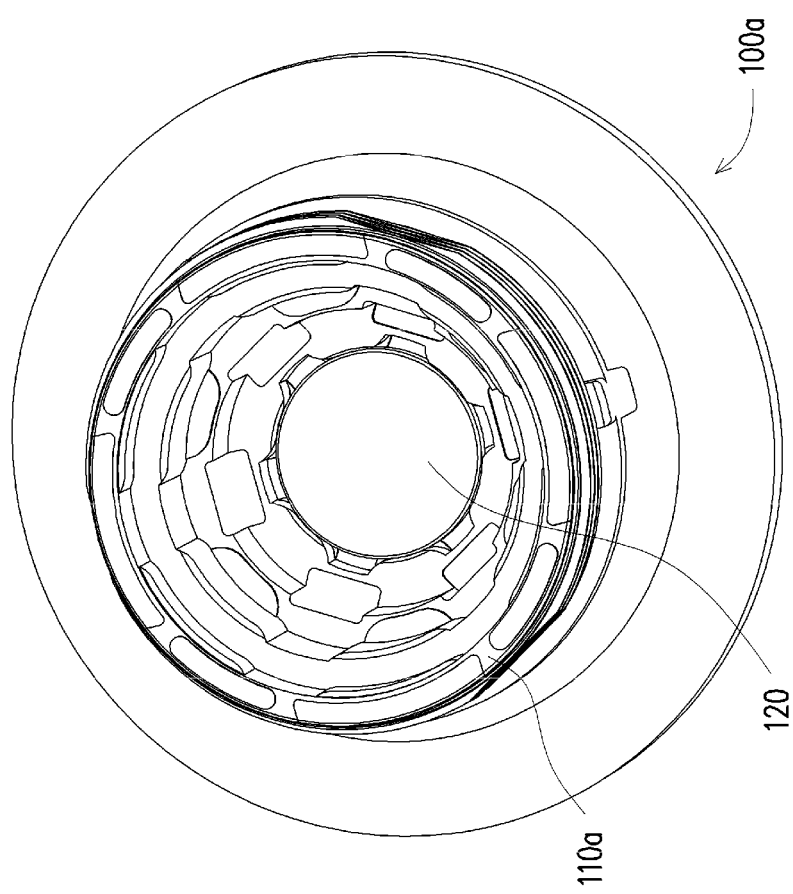
FIG. 1A is a perspective view of a lens structure in accordance with an embodiment of the invention.
Figure 1B:
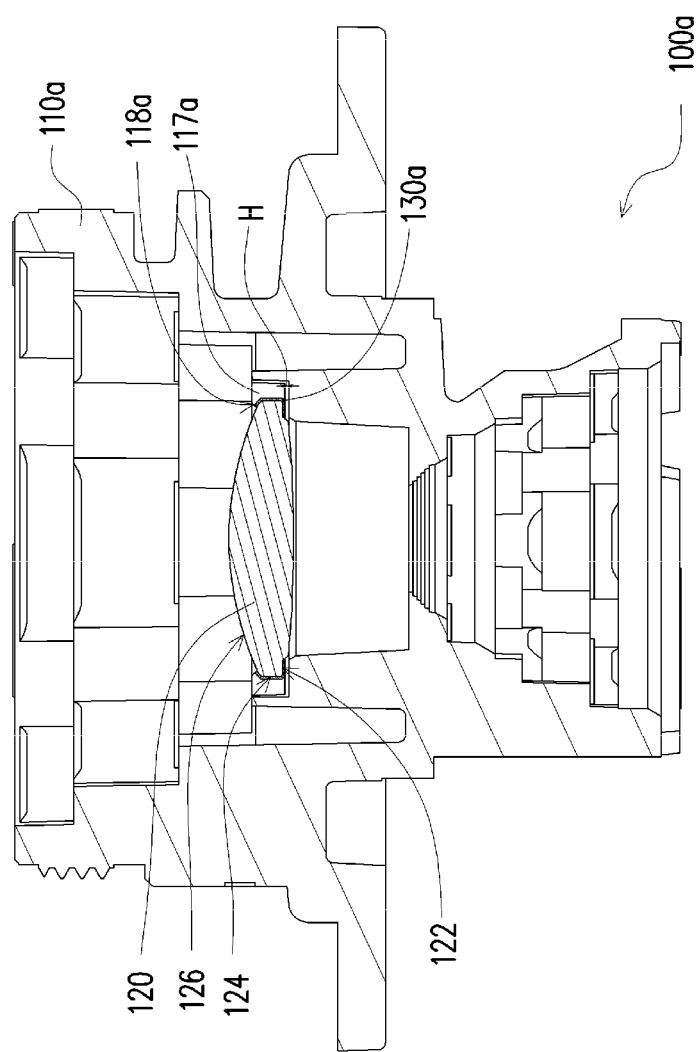
FIG. 1B is a cross-sectional view of the lens structure shown in FIG. 1A.
Figure 1C:
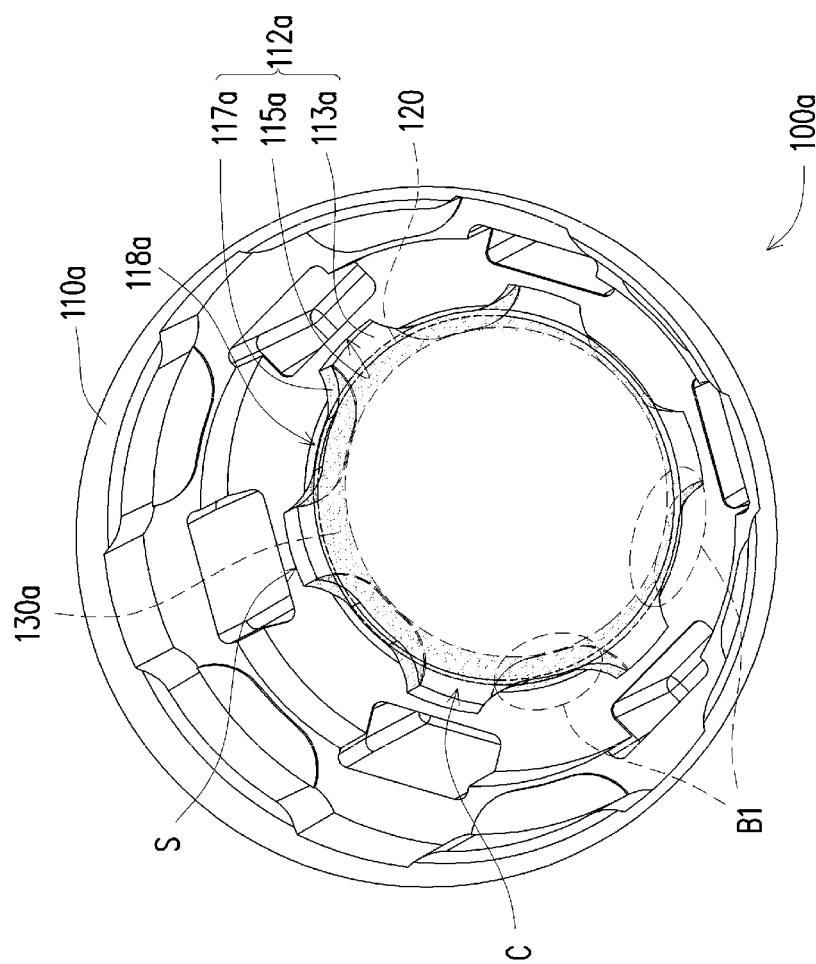
FIG. 1C is a partial enlarged view of the lens structure shown in FIG. 1A.

FIG. 1A is a perspective view of a lens structure in accordance with an embodiment of the invention. FIG. 1B is a cross-sectional view of the lens structure shown in FIG. 1A. FIG. 1C is a partial enlarged view of the lens structure shown in FIG. 1A.

With reference to FIGS. 1A, 1B, and 1C simultaneously, in the present embodiment, a lens structure 100a comprises a lens cone 110a, at least one lens 120 (only one is shown in the figures) and an UV adhesive 130a. The lens cone 110a comprises at least one contacting structure 112a (only one is shown in the figures), and the lens 120 is disposed within the lens cone 110a and abuts against the contacting structure 112a. The UV adhesive 130a is at least located on an interface B1 between the lens cone 110a and the lens 120 to fix the lens 120 within the lens cone 110a. Herein, the lens structure 100a is, for example, a lens of Internet Protocol Camera (IP Cam), but the invention is not limited thereto.

In detail, the contacting structure 112a of the lens cone 110a of the present embodiment comprises a contacting surface 113a, a peripheral side wall 115a connected to the contacting surface 113a and a plurality of protruding portions 117a which are separated from each other and extended from a side S of a peripheral side wall 115a which is relatively away from of the contacting surface 113a onto the contacting surface 113a. The lens 120 has a contacting surface 122 and a side surface 124 connected to the contacting surface 122. The interface B1 is located between the protruding portions 117a of the contacting structure 112a and the contacting surface 122 of the lens 120 and between the protruding portions 117a of the contacting structure 112a and a side surface 124 of the lens 120. Compared to the conventional adhesive which is located on the light incidence surface or the light emitting surface of the lens and between a partial peripheral surface of the lens and a partial side wall of the lens cone, the coverage area of the UV adhesive 130a of the present embodiment accounts for more than 70% of a surface area of a side surface 124 of the lens 120. That is, the gluing surface covers the most area of the interface B1. Therefore, the adherence between the lens cone 110a and the lens 120 can be effectively improved. In addition, the UV adhesive 130a of the present embodiment is not located on the light incidence surface or the light emitting surface of the lens 120 (i.e., with respect to the surface 126 of the contacting surface 122). Therefore, the light transmission efficiency of the lens 120 cannot be affected. The lens structure 100a thus has a better optical characteristic.

Further, each of the protruding portions 117a which extends onto the contacting surface 113a of the contacting structure 112a has a height difference H with respect to the contacting surface 113a to define a recess C. Each of the protruding portions 117a has an inclined surface 118a inclined towards the contacting surface 113a, and the UV adhesive 130a is further located on the inclined surface 118a of each of the protruding portions 117a and within the recess C. That is, a portion of the UV adhesive 130a (such as the redundant UV adhesive 130a) may be located within the recess C defined by the contacting surface 113a and the protruding portions 117a.

In addition, the UV adhesive 130a of the present embodiment is, for example, 8161 UV-curable pressure sensitive adhesive, wherein the viscosity of this adhesive is 1500 cps to 2200 cps at exactly 25° C. Further, the typical curing conditions of this adhesive is by irradiated with a medium pressure mercury UV lamp in the light intensity of 100 mW/cm$^2$ for 12 seconds to 20 seconds, wherein the wavelength of the UV-light is preferably between 220 nm to 400 nm. Furthermore, the operating temperature of this adhesive is between −40° C. to 110° C. The thermal shock test is performed back and forth 15 times in different environments at −40° C. to 80° C. The shelf life of this unopened adhesive is 8 months at 20° C.

Of course, the UV adhesive 130a can also be the UV/heat curable adhesives with the trade name DELO DUALBOND®RE3440. The operating temperature of this adhesive is between −40° C. to 130° C. It can be pre-cured by UVA light with a wavelength between 320 nm to 400 nm within 1 to 5 seconds. The temperature for heat curing is from 80° C. to 130° C. In addition, the viscosity of this adhesive is 13000 mPas at exactly 23° C.

Since the UV adhesive 130a of the present embodiment is located between the protruding portions 117a of the contacting structure 112a and the contacting surface 122 of the lens 120 and between the protruding portions 117a of the contacting structure 112a and a side surface 124 of the lens 120, a larger gluing surface between the lens 120 and the lens cone 110a is obtained. Therefore, the adherence between the lens 120 and lens cone 110a can be effectively improved. In addition, since the UV adhesive 130a of the present embodiment is not located on the surface 126, the light incidence surface or the light emitting surface, of the lens 120, the light transmission efficiency of the lens 120 will not be affected. In brief, the lens structure 100a of the present embodiment may have a better optical characteristic and a structural reliability.

It should be noted that the following embodiment follows the reference numerals and a portion of the content of the aforementioned embodiment, wherein the same reference numerals are used to denote the same or like parts and the description of the same technique is omitted. The description of the omitted portion may be found in the aforementioned embodiments and will not be repeated in the following embodiment.

Figure 2A:
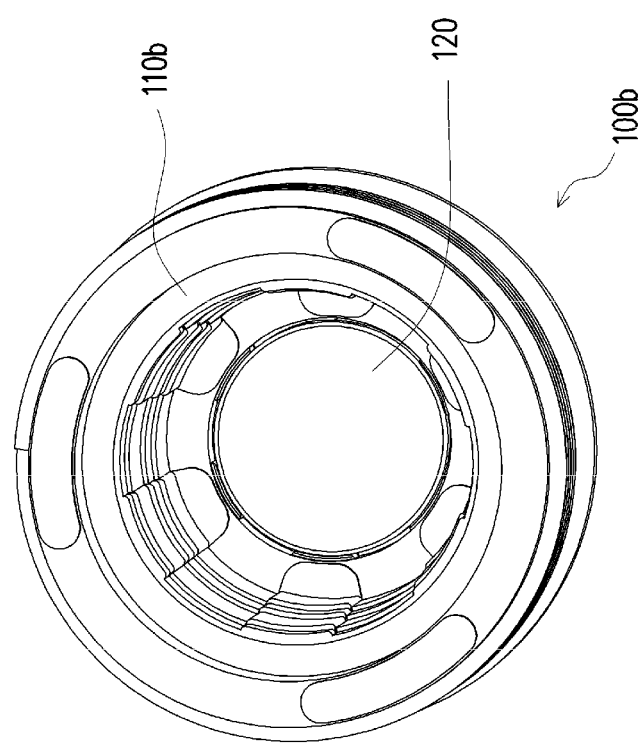
FIG. 2A is a perspective view of a lens structure in accordance with another embodiment of the invention.
Figure 2B:
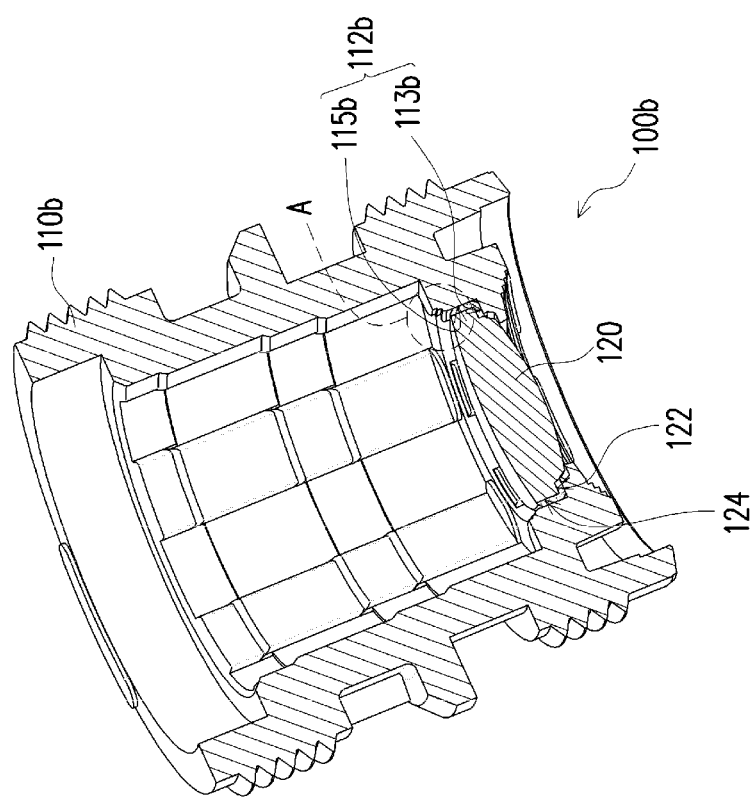
FIG. 2B is a cross-sectional side view of the lens structure shown in FIG. 2A.
Figure 2C:
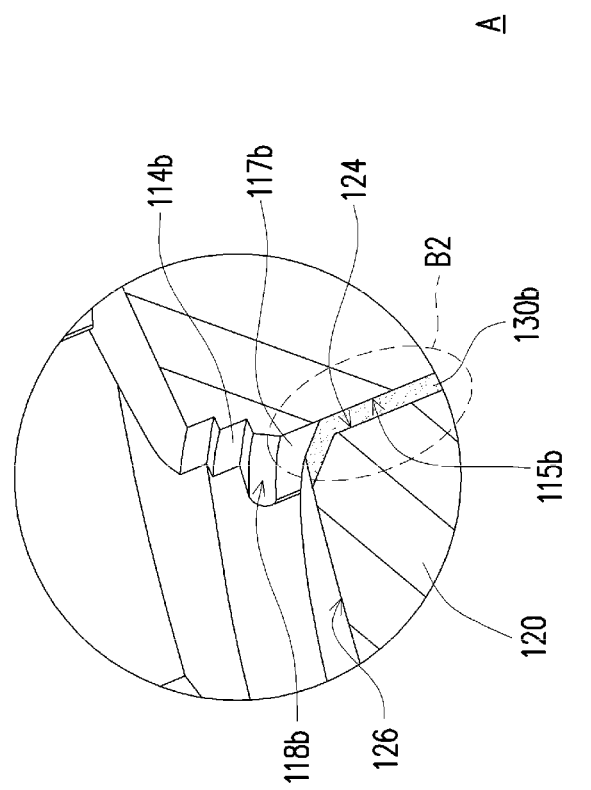
FIG. 2C is a partial enlarged view of the region A of the lens structure shown in FIG. 2A.

FIG. 2A is a perspective view of a lens structure in accordance with another embodiment of the invention. FIG. 2B is a cross-sectional side view of the lens structure shown in FIG. 2A. FIG. 2C is a partial enlarged view of the region A of the lens structure shown in FIG. 2A. Firstly, with reference to FIGS. 1A and 2A simultaneously, the lens structure 100b of the present embodiment is similar to the lens structure 100a shown in FIG. 1A. The difference between the two lens structures is the lens structure 100b of the present embodiment is, for example, a lens of a vehicle image acquisition device.

In detail, with reference to FIGS. 2A, 2B, and 2C simultaneously, the contacting structure 112b of the lens cone 110b of the present embodiment comprises a contacting surface 113b and a peripheral side wall 115b connected to the contacting surface 113b. An interface B2 is located between a contacting surface 113b of the contacting structure 112b and a contacting surface 122 of the lens 120 and between a peripheral side wall 115b of the contacting structure 112b and a side surface 124 of the lens 120. Herein, since a higher structural reliability is required for the lens structure 100b, the UV adhesive 130a of the aforementioned embodiment is replaced with a moisture-curable adhesive 130b.

In addition, the lens cone 110b further comprises a wall 114b and a plurality of protruding portions 117b which are separated from each other and located on the wall 114b, wherein the protruding portions 117b are connected to the peripheral side wall 115b of the contacting structure 112b, and each of the protruding portions 117b has an inclined surface 118b inclined towards the contacting surface 113b. The wall 114b is disposed in order to prevent a glue needle (not shown) from inclining. The inclined surface 118b of the protruding portions 117b can guide the moisture-curable adhesive 130b to move along the peripheral side wall 115b of the contacting structure 112b. The moisture-curable adhesive 130b is located on an interface B2 between the lens cone 110b and the lens 120 to fix the lens 120 within the lens cone 110b.

Of course, in other embodiments which are not illustrated, the adhesive can also be an acrylate adhesive, a polyurethane resin adhesive, an acrylic bonding adhesive or other suitable adhesives. Those skilled in the art should be able to achieve desirable technical effects by selectively a suitable adhesive based on the descriptions provided in the above embodiments and according to the actual requirements.

Based on the above, the adhesive of the lens structure of the embodiments of the invention is located between the contacting structure of the lens cone and the contacting surface of the lens and between the contacting structure of the lens cone and the side surface of the lens. Compared to the conventional lens structure in which the adhesive is located on the light incidence surface or the light emitting surface of the lens and between a partial side surface of the lens and a partial side wall of the lens cone, the coverage area of the adhesive of the lens structure of the embodiments of the invention accounts for more than 70% of a surface area of a side surface of the lens. Therefore, a gluing surface between the lens cone and the lens may be increased to improve the adherence. In addition, the adhesive is not located on the light incidence surface or the light emitting surface of the lens, and thus the light transmission efficiency of the lens is not affected. In brief, the lens structure of the embodiments of the invention can have a better optical characteristic and a structural reliability.

Although the embodiments are already disclosed as above, these embodiments should not be construed as limitations on the scope of the invention. It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A lens structure comprising:
   a lens cone comprising at least one contacting structure;
   at least one lens disposed within the lens cone and abuts against the contacting structure; and
   an acrylate adhesive covering an interface between the lens cone and the lens, wherein a coverage area of the acrylate adhesive accounts for more than 70% of a surface area of a side surface of the lens,
   wherein the lens has a first contacting surface and a side surface connected to the first contacting surface, and the contacting structure comprises a second contacting surface and a peripheral side wall connected to the second contacting surface;
   wherein the interface is located between the second contacting surface of the contacting structure and the first contacting surface of the lens and between the peripheral side wall of the contacting structure and the side surface of the lens.

2. The lens structure as recited in claim 1, wherein the lens cone further comprises a wall and a plurality of protruding portions which are separated from each other and located on the wall, wherein the protruding portions are connected to the peripheral side wall of the contacting structure, and each of the protruding portions has an inclined surface inclined towards the second contacting surface.

3. The lens structure as recited in claim 1, wherein the contacting structure further comprises a plurality of protruding portions which are separated from each other and extended from a side of the peripheral side wall which is relatively away from the second contacting surface onto the second contacting surface, and the interface is located between the protruding portions of the contacting structure and the first contacting surface of the lens and between the protruding portions of the contacting structure and the side surface of the lens.

4. The lens structure as recited in claim 3, wherein each of the protruding portions which extends onto the second contacting surface has a height difference with respect to the second contacting surface to define a recess, and each of the protruding portions has an inclined surface inclined towards the second contacting surface.

5. The lens structure as recited in claim 4, wherein the acrylate adhesive is further located on the inclined surface of each of the protruding portions and within the recess.

6. A lens structure comprising:
   a lens cone comprising at least one contacting structure;
   at least one lens disposed within the lens cone and abuts against the contacting structure, and the lens has a first contacting surface and a side surface connected to the first contacting surface; and
   an adhesive located between the contacting structure of the lens cone and the first contacting surface of the lens and between the contacting structure of the lens cone and the side surface of the lens,
   wherein the adhesive contacts the contacting structure of the lens cone, the first contacting surface of the lens, and the side surface of the lens.

7. The lens structure as recited in claim 6, wherein the adhesive comprises an UV adhesive, a moisture-curable adhesive, a polyurethane resin adhesive, or an acrylic bonding adhesive.

8. The lens structure as recited in claim 6, wherein a surface contacted by the lens cone, the lens, and the adhesive is defined as an interface.

9. The lens structure as recited in claim 8, wherein the contacting structure comprises a second contacting surface and a peripheral side wall connected to the second contacting surface.

10. The lens structure as recited in claim 9, wherein the interface is located between the second contacting surface of the contacting structure and the first contacting surface of the lens and between the peripheral side wall of the contacting structure and the side surface of the lens.

11. The lens structure as recited in claim 9, wherein the lens cone further comprises a wall and a plurality of protruding portions which are separated from each other and located on the wall, wherein the protruding portions are connected to the peripheral side wall of the contacting structure, and each of the protruding portions has an inclined surface inclined towards the second contacting surface.

12. The lens structure as recited in claim 9, wherein the contacting structure further comprises a plurality of protruding portions which are separated from each other and extended from a side of the peripheral side wall which is relatively away from the second contacting surface onto the second contacting surface, and the interface is located between the protruding portions of the contacting structure and the first contacting surface of the lens and between the protruding portions of the contacting structure and the side surface of the lens.

13. The lens structure as recited in claim 12, wherein each of the protruding portions which extends onto the second contacting surface has a height difference with respect to the second contacting surface to define a recess, and each of the protruding portions has an inclined surface inclined towards the second contacting surface.

14. The lens structure as recited in claim 13, wherein the adhesive is further located on the inclined surface of each of the protruding portions and within the recess.

15. A manufacturing process of a lens structure comprising:
    providing a lens cone comprising a contacting structure;
    disposing an adhesive at a peripheral side wall of the contacting structure; and
    disposing a lens within the lens cone and abutting the lens against the contacting structure after disposing the adhesive, wherein the adhesive is located between a side surface of the lens and the peripheral side wall of the contacting structure, and the coverage area of the adhesive accounts for more than 70% of the surface area of the side surface.

16. The manufacturing process of the lens structure as recited in claim 15, wherein a surface contacted by the lens cone, the lens, and the adhesive is defined as an interface, and the lens has a first contacting surface and a side surface connected to the first contacting surface, and the contacting structure comprises a second contacting surface and a peripheral side wall connected to the second contacting surface.

17. The manufacturing process of the lens structure as recited in claim 16, wherein the interface is located between the second contacting surface of the contacting structure and the first contacting surface of the lens and between the peripheral side wall of the contacting structure and the side surface of the lens.

18. The manufacturing process of the lens structure as recited in claim 16, wherein the contacting structure further comprises a plurality of protruding portions which are separated from each other and extended from a side of the peripheral side wall which is relatively away from the second contacting surface onto the second contacting surface, and the interface is located between the protruding portions of the contacting structure and the first contacting surface of the lens and between the protruding portions of the contacting structure and the side surface of the lens.

19. The manufacturing process of the lens structure as recited in claim 18, wherein each of the protruding portions which extends onto the second contacting surface has a height difference with respect to the second contacting surface to define a recess, and each of the protruding portions has an inclined surface inclined towards the second contacting surface.

20. The manufacturing process of the lens structure as recited in claim 19, wherein the adhesive is further located on the inclined surface of each of the protruding portions and within the recess.

* * * * *